United States Patent
Venkataraman et al.

(10) Patent No.: US 11,474,933 B2
(45) Date of Patent: *Oct. 18, 2022

(54) TEST CYCLE OPTIMIZATION USING CONTEXTUAL ASSOCIATION MAPPING

(71) Applicant: Accenture Global Solutions Limited, Dublin (IE)

(72) Inventors: Mahesh Venkataraman, Bangalore (IN); Kishore P. Durg, Bangalore (IN); Mallika Fernandes, Bangalore (IN); Sunder Ranganathan Nochilur, Bangalore (IN); Jothi Gouthaman, Chennai (IN); Radhika Golden, Trivandrum (IN); Venugopal S. Shenoy, Bangalore (IN); Srinatha Sreedhara Mulugund, Bangalore (IN); Gopi Krishna Durbhaka, Hyderabad (IN); Ramchand R. Bhambhani, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,053

(22) Filed: Jun. 25, 2021

(65) Prior Publication Data

US 2021/0326241 A1    Oct. 21, 2021

Related U.S. Application Data

(63) Continuation of application No. 16/721,269, filed on Dec. 19, 2019, now Pat. No. 11,080,171.

(30) Foreign Application Priority Data

Jan. 17, 2019    (IN) .............................. 201911002096

(51) Int. Cl.
*G06F 11/36*    (2006.01)

(52) U.S. Cl.
CPC ...... *G06F 11/3676* (2013.01); *G06F 11/3688* (2013.01)

(58) Field of Classification Search
CPC .................. G06F 11/3688; G06F 11/3676
See application file for complete search history.

(56) References Cited

U.S. PATENT DOCUMENTS

| 6,408,403 B1 | 6/2002 | Rodrigues et al. |
| 7,093,238 B2 | 8/2006 | Givoni et al. |

(Continued)

OTHER PUBLICATIONS

Accenture, "Using artificial intelligence to augment and accelerate software testing", Accenture Labs Precision Testing, Jan. 1, 2017, pp. 1-16.

(Continued)

*Primary Examiner* — Qing Chen
*Assistant Examiner* — Amir Soltanzadeh
(74) *Attorney, Agent, or Firm* — Fish & Richardson P.C.

(57) ABSTRACT

Methods, systems, and apparatus, including computer programs encoded on a computer storage medium, for test cycle optimization using contextual association mapping. In one aspect, a method includes obtaining an artifact that includes a collection of reference items, where each reference item includes a sequence of words, generating candidate tags from each of the reference items based on the sequences of words in the reference items, selecting a subset of the candidate tags as context tags based on an amount that the candidate tags appear in the reference items, obtaining a sample item that includes a sequence of words, identifying a subset of the context tags in the sequence of words in the sample item, and classifying a subset of the reference items as contextually similar to the sample item based the context tags that were identified.

20 Claims, 6 Drawing Sheets

(56) References Cited

U.S. PATENT DOCUMENTS

| | | | | |
|---|---|---|---|---|
| 7,836,346 | B1 * | 11/2010 | Davidov | G06F 11/3692 |
| | | | | 717/124 |
| 8,001,125 | B1 * | 8/2011 | Magdalin | G06F 16/36 |
| | | | | 717/124 |
| 8,423,960 | B2 * | 4/2013 | Farchi | G06F 11/3676 |
| | | | | 717/124 |
| 9,971,674 | B2 * | 5/2018 | Hwang | G06F 11/3664 |
| 10,073,763 | B1 | 9/2018 | Raman et al. | |
| 2007/0226691 | A1 | 9/2007 | Happell et al. | |
| 2008/0222142 | A1 | 9/2008 | O'Donnell | |
| 2018/0004637 | A1 | 1/2018 | Chandra et al. | |
| 2020/0233782 | A1 | 7/2020 | Venkataraman et al. | |

OTHER PUBLICATIONS

EP Search Report in European Applciation No. EP20152322, dated Mar. 12, 2020, 11 pages.

McMillan et al., "Detecing similar software applications", 34th International Conference on Software Engineering, Jun. 2, 2012, pp. 364-374.

McMillan et al., "Portfolio: finding relevant fuctions and their usage" 33rd International Conference on Software Engineering, May 21, 2011, pp. 11-120.

Thung et al., "Detecting similar applications with collaborative tagging" 28th International Conference on Software Maintenance, Sep. 23, 2012, pp. 600-603.

* cited by examiner

TEST CYCLE OPTIMIZATION USING CONTEXTUAL ASSOCIATION MAPPING

CROSS-REFERENCE TO RELATED APPLICATIONS

This application is a continuation of U.S. application Ser. No. 16/721,269, filed Dec. 19, 2019, which claims priority from Indian Provisional Application No. 201911002096, filed Jan. 17, 2019. The contents of the prior applications are incorporated herein by reference in their entirety.

TECHNICAL FIELD

This application generally relates to test cycle optimization.

BACKGROUND

Software applications are designed to accommodate a multitude of transactions, where each transaction often requires the performance of a significant number of functions. Testing of software applications may include creating test cases based on requirements and then executing the test cases through, for example, a test script to detect defects. Test cases may be automated using commercial and open source tools to reduce execution time. For example, a regression test suite is a set of test cases, often written in the form of a script, designed to ensure that each of these functions remain accurate and correct following modification of the underlying programming code. Execution of these suites helps to ensure that defects have not been introduced or uncovered in unchanged areas of the codebase as a result of the modification. Moreover, each level of testing (e.g., unit testing, system testing, and acceptance testing) may have its own regression test suite. Providers of these software applications and/or their corresponding services are faced with the problem of having large regression test suites that are executed manually and the need to automate these test suites to function within any one of a number of industry standard automation tools. Once automated, these test cases can be executed repeatedly and frequently, which adds to the amount of testing coverage for the respective application. However, effective and efficient management of such suites of test cases is both time consuming and effort intensive.

SUMMARY

Implementations of the present disclosure are generally directed to test cycle optimization using contextual association mapping. Testing systems may be a very time-consuming and expensive activity. Testing aims to reduce the risk of systems going "live" to production within acceptable levels of risk. Accordingly, a manager of a test may need to optimize the test cycle in varieties of ways in order to maximize requirements coverage and defect discovery within the constraints of available time and resources. The optimization may include choices like optimal selection of test cases based on various factors, duplication removal, logical clustering of test cases and defects, and optimal assignment of testers and developers to various tasks etc. Contextual association mapping may aid a manager of a test to make data driven optimization choices.

In a general implementation, a system includes one or more processors; and a computer-readable storage device coupled to the one or more processors and having instructions stored thereon which, when executed by the one or more processors, cause the one or more processors to perform operations that include obtaining an artifact that includes a collection of reference items, where each reference item includes a sequence of words, generating candidate tags from each of the reference items based on the sequences of words in the reference items, selecting a subset of the candidate tags as context tags based on an amount that the candidate tags appear in the reference items, obtaining a sample item that includes a sequence of words, identifying a subset of the context tags in the sequence of words in the sample item, and classifying a subset of the reference items as contextually similar to the sample item based the context tags that were identified.

These and other implementations can each optionally include one or more of the following innovative aspects. In certain aspects, selecting a subset of the candidate tags as context tags based on an amount that the candidate tags appear in the reference items includes determining, for each candidate tag, a number of reference items in which the candidate tag appears and determining, for each candidate tag, whether to select the candidate tag based on the number of reference items in which the candidate tag appears. In some aspects, determining, for each candidate tag, whether to select the candidate tag based on the number of reference items in which the candidate tag appears includes determining that a proportion of the reference items that the candidate tag appears in satisfies a proportion criteria.

In some implementations, classifying a subset of the reference items as contextually similar to the sample item based the context tags that were identified includes determining that each of the reference items in the subset of reference items includes at least one of the context tags that were identified. In certain aspects, generating candidate tags from each of the reference items based on the sequences of words in the reference items includes generating the candidate tags from a particular reference item of the reference items based on different portions of the sequence of words in the reference item. In some aspects, identifying a subset of the context tags in the sequence of words in the sample item includes for each context tag, determining whether the sequence of words in the sample item include the context tag and in response to determining that the sequence of words in the sample item includes a particular context tag of the context tags, identifying the particular context tag.

In some implementations, identifying a subset of the context tags in the sequence of words in the sample item includes determining a domain of the sample item and selecting the context tags based on the domain of the sample item. In certain aspects, actions include determining signatures for each of the context tags and determining attributes for each of the signatures, where classifying a subset of the reference items as contextually similar to the sample item based the context tags that were identified includes determining that the signatures for the context tags that were identified match signatures for the context tags in the reference items of the subset of the reference items. In some aspects, the reference items are test cases and the actions further include executing the subset of the reference items classified as contextually similar to the sample item based the context tags that were identified.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
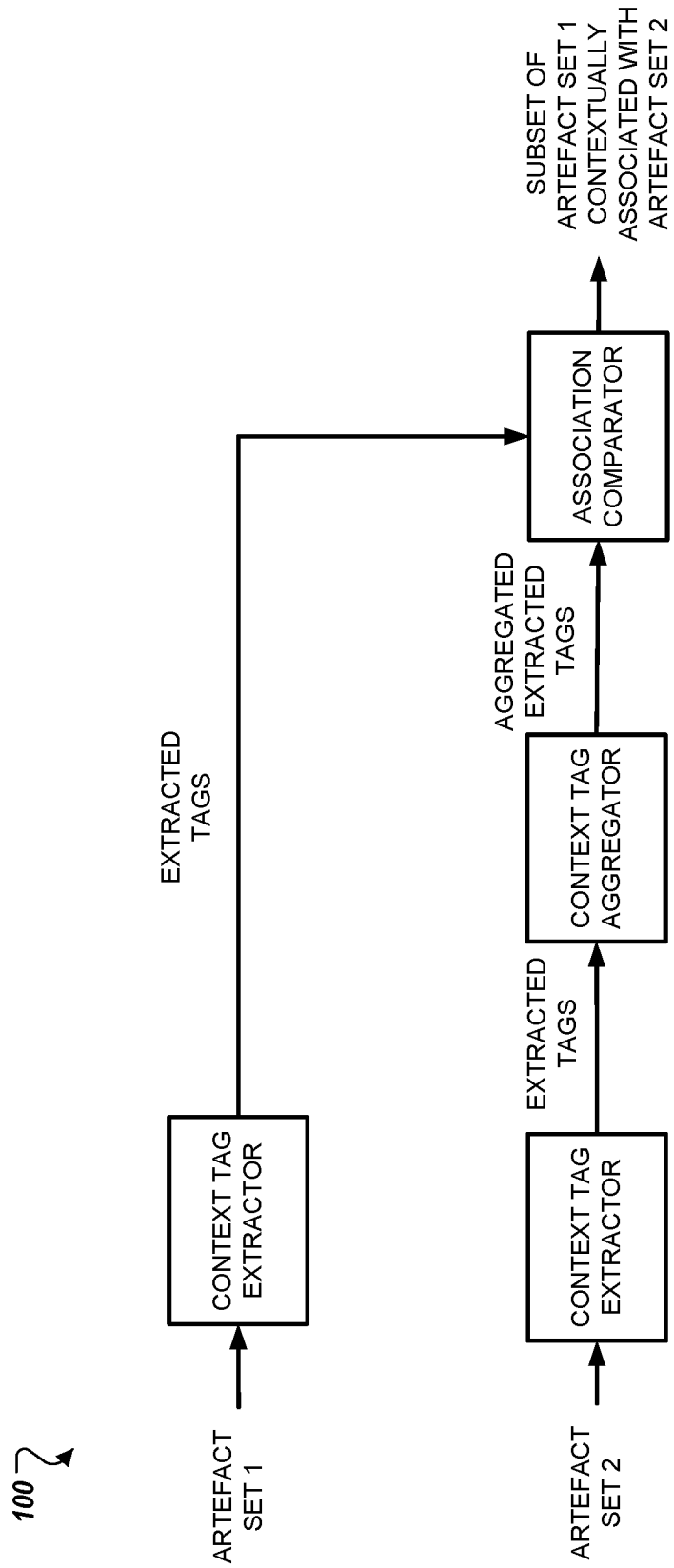
FIG. 1 illustrates a block diagram of an example system for test cycle optimization using contextual association mapping.

Market and competition landscape is getting increasingly dynamic and demanding, driving the need for feature agility, quality and reliability. Testing may seek to verify system readiness to "go-live" within the constraints of cost and time parameters. Fundamentally, testing may be split into two broad facets. The first facet may involve planning, execution and defect discovery. The second facet may involve reporting and managing the defect resolution cycle that involves collaboration with developers to fix and re-test the defects to closure.

Testing may face multiple challenges in fulfilling this objective. First, automation of test cases to run in unattended mode may be effort intensive and may involve careful selection of tools, strategy, design, coding and ongoing maintenance. Secondly, there may be infinite ways a system can be used by end users and it may not be possible for a tester to test for all permutations and combinations. Thirdly, an important function of testing is to find defects but a system may fail in numerous ways under various stimulus conditions that are not envisioned by a tester. Absence of evidence may not necessarily be evidence of absence and so there could be hidden fault chains that could be undetected no matter how many tests get executed.

For testing to enable achievement of go-live milestone within the boundaries of time and cost parameters, there may two broad imperatives, optimization of test coverage to maximize coverage and defect discovery and optimization of defect resolution to minimize resolution time and rapidly improve go-live worthiness of the system. The testing may be required to achieve the above imperatives in the face of challenges arising from uncertainty, ambiguity and opacity. Artificial intelligence driven techniques may be used to address these challenges.

A manager of a test may make optimization choices based on intuition and heuristics leading to sub optimal use of resources. In many cases, either testing is "over-engineered" leading to higher costs and cycle time or "under-engineered" leading to higher failure rate in production. The optimization choices that a manager of a test may need to make are formulated as "questions" for some sample use cases as follows.

First, how to identify duplicate test cases, e.g., redundancy removal. As the test suite size increases, redundancy may creep in since new authors may not be able to review the old test cases and avoid redundancies. Accordingly, it may be important to periodically check for duplicate test cases and remove/merge them.

Second, how to prioritize and identify test cases based on production usage, e.g., prioritization based on usage patterns. While it is true that a system may get developed for numerous use cases, all these use cases and execution pathways may not actually be exercised by users. Accordingly, it may be important to prioritize the test cases that exercise the same usage patterns and execution pathways in production and run the other test cases if time and resources permit.

Third, how to prioritize and identify test cases based on production failure patterns, e.g., prioritization based on failure patterns. A key objective of testing may be to exercise failure pathways, trigger fault chains and provoke the system to fail so that the fault chains can be unearthed. Accordingly, it may be important to prioritize the test cases that are associated with execution pathways that have history of failure.

Fourth, how to prioritize and identify test cases based on churn, e.g., prioritization based on churn. Any change may have a risk of failure. Accordingly, it may be important to prioritize test cases that are associated with features/functions that have undergone change. In addition, additional priority may need to be given to features/functions that have undergone "burst" changes, i.e., multiple changes in consecutive builds.

Fifth, how to group test cases based on their contextual similarity and assign them to appropriate tester, e.g., grouping and assigning. Once the test cases are identified based on above, it may be important to group them based on similarity and then assign them to the right tester to execute.

Sixth, how to identify duplicate defects, e.g., defect redundancy removal. Removal of duplicate defects may minimize wastage of time and resources in investigations.

Seventh, how to group defects based on contextual similarity and assign to appropriate developer. When defects are reported, it may be important to group them based on similarity and assign them to the developers who are best skilled to resolve them.

Eighth, how to identify defects that are contextually similar to the previously found defects, e.g., prioritization based on recurrence. Defects that are associated with those found earlier may be identified and prioritized since they may need deeper investigations. This may be because the defects were seemingly fixed earlier but have recurred.

Essentially, the above optimization questions may be generalized as "given a set of input artifacts X, how do I identify a subset which are contextually associated with another set of reference artifacts Y." Contextual association between two artifacts may refer to the common dimensions of interest, the dimensions being Application, Business process, Operations on the business process, Test parameters, Environment requirements, and Validation performed.

The phrase 'Context Tags' may be used for the six dimensions. For example, a test case could be related to another test case having a common context "business process tag=Trading", i.e., both of them are related to testing of Trading business process. Multiple associations may be possible between two artifacts.

Combinations of contextual associations are depicted in Table 1 below as Use Case numbers (UCn):

TABLE 1

| | | ....contextually associated with a set of V | | | | | |
|---|---|---|---|---|---|---|---|
| | X Y | Test Case | Defects | Prod Incidents | Top usage patterns | Top Failure patterns | Requirements |
| Identification of X... | Test Cases | UC1 | UC2 | UC3 | UC4 | UC5 | UC6 |
| | Defects | UC7 | UC8 | UC9 | UC10 | UC11 | UC12 |
| | Prod incidents | UC14 | UC15 | UC15 | UC16 | UC17 | UC18 |
| | Top usage patterns | UC19 | UC20 | UC21 | UC22 | UC23 | UC24 |
| | Top Faure patterns | UC25 | UC26 | UC27 | UC28 | UC29 | UC30 |
| | Requirements | UC31 | UC32 | UC33 | UC34 | UC35 | UC36 |

Table 2 below describes each use case:

TABLE 2

| Use Case ID | Use Case Description | Optimization Problem Addressed |
|---|---|---|
| UC1 | Identify all Test Cases contextually similar with a given set of test cases | Duplicate removal, clustering of similar test cases to optimize assignment and execution |
| UC2 | Identify all Test Cases contextually associated with a given set of defects | Test case selection for retesting of resolved defects. |
| UC3 | Identify all Test Cases contextually associated with a given set of production incidents | Strengthen the defect yielding capability of test cases especially the ones related to production incidents. Giving them more attention . . . |
| UC4 | Identify all Test Cases contextually associated with a given set of top usage patterns | To prioritize test cases related to top usage |
| UC5 | Identify all Test Cases contextually associated with a given set of top failure patterns | To prioritize test cases related to top failure patterns |
| UC6 | Identify all Test Cases contextually associated with a given set of requirements | To prioritize test cases related to requirements of interest identified by SME |
| UC7 | Identify all defects contextually associated with a given set of test cases | To further analyze the nature of the defects yielded by the given set of test cases. |
| UC8 | Identify all defects contextually associated with a given set of defects | Duplicate removal, clustering of similar defects to optimize assignment and resolution |
| UC9 | Identify all defects contextually associated with a given set of production incidents | To further analyze root cause of production incidents and eliminate fault chains |
| UC10 | Identify all defects contextually associated with a given set of top usage patterns | To further analyze these high-risk defects and eliminate risky fault chains |
| UC11 | Identify all defects contextually associated with a given set of top failure patterns | To further analyze these high-risk defects and eliminate risky fault chains |
| UC12 | Identify all defects contextually associated with a given set of requirements | To analyze defects related to requirements of interest identified by SME |
| UC13 | Identify all production incidents contextually associated with a given set of test cases | To further analyze to improve the effectiveness of test cases related to production incidents. Determine the causes for defect 'slippage' to production |

TABLE 2-continued

| Use Case ID | Use Case Description | Optimization Problem Addressed |
|---|---|---|
| UC14 | Identify all production incidents contextually associated with a given set of defects | Cluster related defects and incidents to resolve them at root cause |
| UC15 | Identify all production incidents contextually associated with a given set of defects | Duplicate removal, clustering of similar incidents to optimize assignment and resolution |
| UC16 | Identify all production incidents contextually associated with a given set of top usage patterns | To further analyze these high-risk incidents and eliminate risky fault chains |
| UC17 | Identify all production incidents contextually associated with a given set of top anomaly patterns | To further analyze these high-risk incidents and identify the causal chain with anomalies |
| UC18 | Identify all production incidents contextually associated with a given set of requirements | To analyze incidents related to requirements of interest identified by SME |
| UC19 | Identify all top usage patterns contextually associated with a given set of test cases | To further analyze and optimize test cases related to top usage patterns |
| UC20 | Identify all top usage patterns contextually associated with a given set of defects | To further analyze and prioritize defects based on usage patterns |
| UC21 | Identify all top usage patterns contextually associated with a given set of incidents | To further analyze and prioritize incidents based on usage patterns |
| UC22 | Not applicable | Not applicable |
| UC23 | Identify all top usage patterns contextually associated with a given set of top anomaly patterns | To further analyze and prioritize top anomaly patterns based on usage patterns |
| UC24 | Identify all top usage patterns contextually associated with a given set of requirements | To further analyze and determine which requirements are most used |
| UC25 | Identify all top failure patterns contextually associated with a given set of requirements | To further analyze and determine which requirements have high risk of failure |
| UC26 | Identify all top anomaly patterns contextually associated with a given set of defects | To further analyze and determine causal chains/root causes |
| UC27 | Identify all top anomaly patterns contextually associated with a given set of production incidents | To further analyze and determine causal chains/root causes |
| UC28 | Identify all top anomaly patterns contextually associated with a given set of top usage patterns | To analyze further and investigate potential failures of top usage features |
| UC29 | Not applicable | Not applicable |
| UC30 | Identify all top anomaly patterns contextually associated with a given set of requirements | To analyze top anomaly patterns related to requirements of interest identified by SME |
| UC31 | Identify all requirements contextually associated with a given set of test cases | To determine the extent of coverage for a given set of test cases |
| UC32 | Identify all requirements contextually associated with a given set of defects | To further analyze requirements that are failing |
| UC33 | Identify all requirements contextually associated with a given set of production incidents | To further analyze requirements that are failing in production |
| UC34 | Identify all requirements contextually associated with a given set of top usage patterns | To identify requirements that are most used and refine them |
| UC35 | Identify all requirements contextually associated with a given set of top anomaly patterns | To identify unstable requirements and remediate |
| UC36 | Not applicable | Not applicable |

FIG. 1 illustrates a block diagram of an example system 100 for test cycle optimization using contextual association mapping. The artifact set 1 may be a set from which to identify the members which are contextually associated with artifact set 2. For example, from a set of test cases, to identify the subset of test cases which are contextually associated with a given set of defects, then the test case set is artifact set 1 and defect set is artifact set 2. The artifact set 1 (hereafter referred to as S1) may be ingested into a context tag extractor which processes the set and extracts the context tags for each member of the set. Artifact set 2 (hereafter referred to as S2) may also be ingested into the context tag extractor which processes the set and extracts the context tags for each member of the set. The context tags may be further aggregated by a context tag aggregator. The context tags of each member of Si may then be compared with the aggregated context tags of S2. At every stage a subject matter expert (SME) may review the step outputs and provide control and correction inputs. For example, the SME may control the process by providing appropriate weightage to the tags. The process may need multiple iterations with human inputs. The human inputs could be one or more of, but not limited to, reviewing the context tags for validity, removing incorrect context tags, and adding context tags to the extract.

Figure 2:
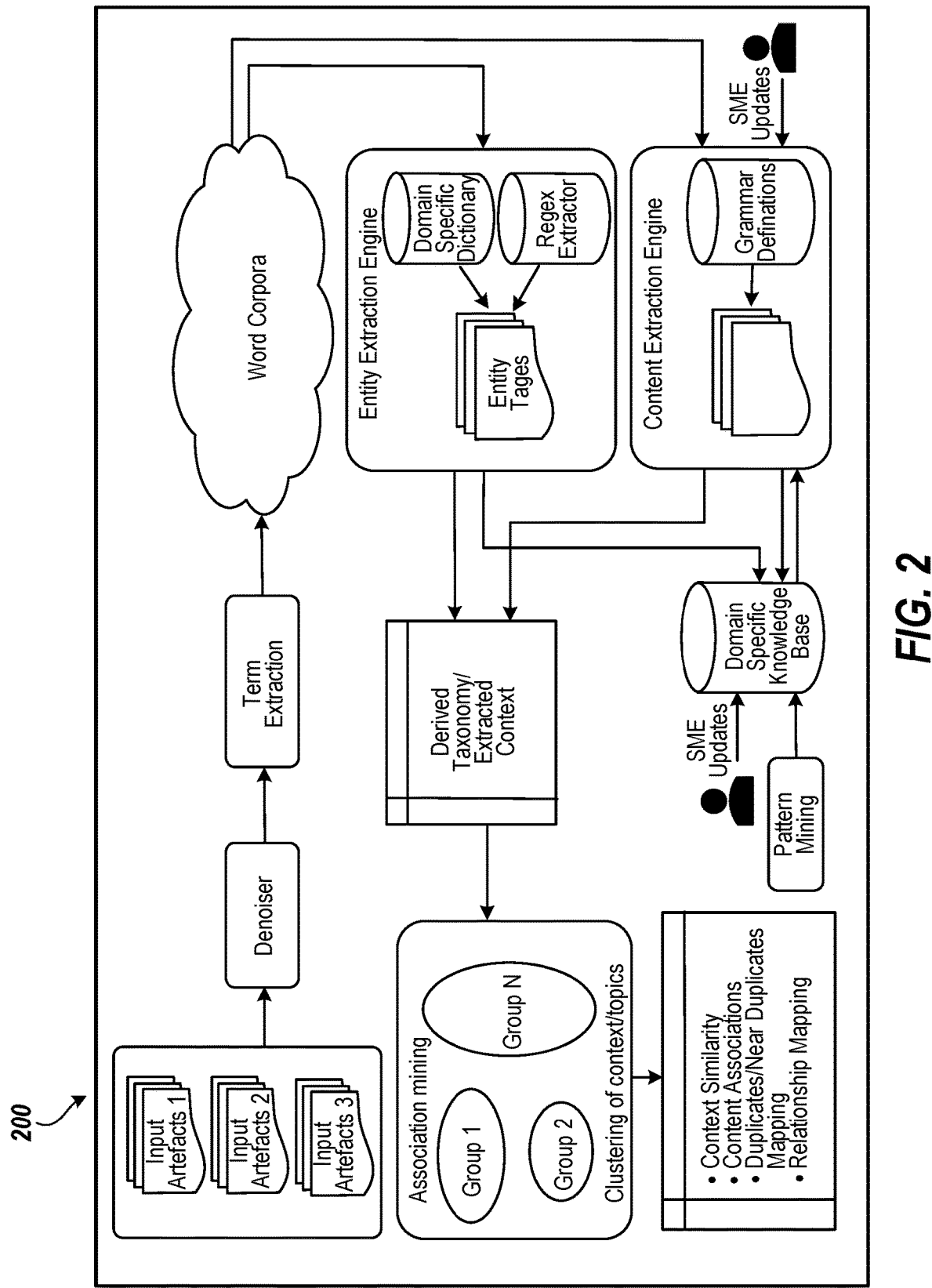
FIG. 2 illustrates a block diagram of an example context tag extractor.

FIG. 2 illustrates a block diagram of an example context tag extractor 200. The context tag extractor 200 includes a denoiser, term extractor, entity extraction engine, domain specific knowledge base, context extraction engine, and association mining engine. The denoiser may ingest artifact text documents, e.g., requirements, test cases, incidents logs, defects list etc., and perform noise reduction which may involve removal of all blank spaces and new line characters.

The term extractor may obtain cleansed data from the denoiser and tokenize the input character stream to create corpora of words. Term extractor may also perform stemming of the words so that only relevant variations of words are retained in the word corpora for further downstream processing.

The entity extraction engine may identify and extract entity tags based on the extraction definitions. There may be two types of entity extraction definitions, regex based extraction and domain specific dictionary extraction. Regex based extraction may be used to extracts standard patterns like numbers, email address etc. Domain specific dictionary extraction may be used to match the existing domain specific data like country/location names.

The domain specific knowledge base may be an industry specific OWL (Web Ontology Language) file which contains the relevant industry contexts/terms and their associated relationships extracted using ontology techniques. The relevant contexts may be extracted using three different sources, pattern mining, context extraction engine, and SME updates.

The context extraction engine may work at two levels, based on the domain specific context knowledge base and grammar definitions. The phrases contained in the word corpora may be first scanned against the domain specific knowledge base to identify the already extracted concepts specific to a domain. If there are no extracted concepts available, then the context extraction engine may execute the grammar definitions. The various parts of speech tags like noun phrases, noun verb phrases, adjectives and verbs may be extracted using the grammar definitions to build the ontology for the word corpora. At every stage of extraction, a SME may review and provide a feedback loop to the grammar definitions. The newly extracted concepts may then be injected to the domain specific knowledge base, so that the models may be transferable and be used across projects without having to refer to the corpus persistently.

The association mining engine may receive the extracted context and relationships and group contextually similar topics to spot the various trends, patterns and associations between artifacts. The engine may generate the context similarities, context associations, duplicate/near duplicate context mapping and relationship mapping.

Figure 3:
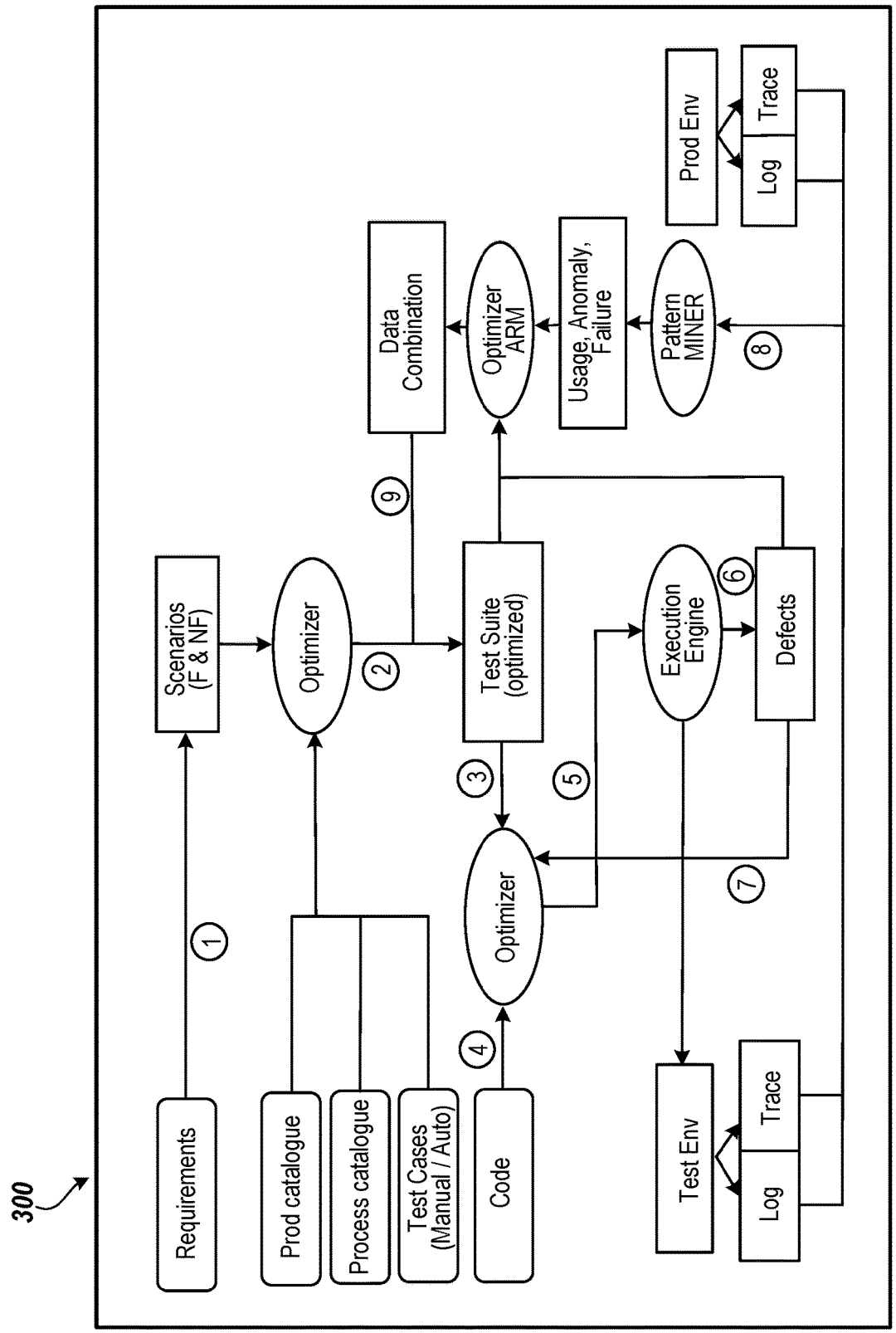
FIG. 3 illustrates a diagram of areas where optimization techniques from the contextual association mapping may be applied.

FIG. 3 illustrates a diagram of areas where optimization techniques from the contextual association mapping may be applied. Optimization may not be a onetime activity but may be a continuous and iterative process. Optimization techniques discussed herein may need to be applied at various stages of the software development life cycle. The following are optimization techniques discussed herein. Textual similarity may be applied within a single artifact (like test case repository, requirements or defects) to identify duplicates entries. An advantage of this technique may be that it is simple and may be performed after every new entry (requirement, test case or defect) is added or an entry is updated. This may help in reducing the size of the artifact (number of requirements, test cases or defects) by deleting duplicates entries.

Contextual similarity based on entity tags and topics may be applied within a single artifact (like test case repository, requirements or defects) to identify similar entries. An advantage of this technique over textual similarity may be that it finds similarities even if the entries (requirements, test cases or defects) are written by individuals across teams, geographies or time frames. This may help in reducing the size of the artifact (number of requirements, test cases or defects) by merging very similar entries. Association mapping may be applied to find association between different artifacts (like requirements and test cases or test cases and defects). This may help in selecting the correct set of test cases based on requirements, usage or defects fixed.

A potential order for optimization may be to apply text similarity and contextual similarity at an artifact level first, and once the individual artifacts are optimized the associating mapping technique may be applied to achieve further optimization. FIG. 3 illustrates key areas where optimization techniques may be applied to derive benefits for effort and cycle time reduction. In each of the optimization steps a single optimization technique or a combination of techniques may be applied based on an optimization goal and data availability. As shown in FIG. 3, steps may include (1) requirements are analyzed to identify unique functional and non-functional scenarios, (2) application specific products, processes, test cases and scenarios identified in (1) are analyzed to identify the right set of test cases, (3, 4, 5) short listed test cases may be compared with code to prioritize test cases based on changes, (6) Test cases are executed to find defects, (7) Defects and test cases are dynamically associated to fine tune test case prioritization, (8) Log files from test and production environments are analyzed to extract usage patterns, and (9) Usage patterns and test cases are processed to recommend data combinations to be used for testing.

Figure 4:
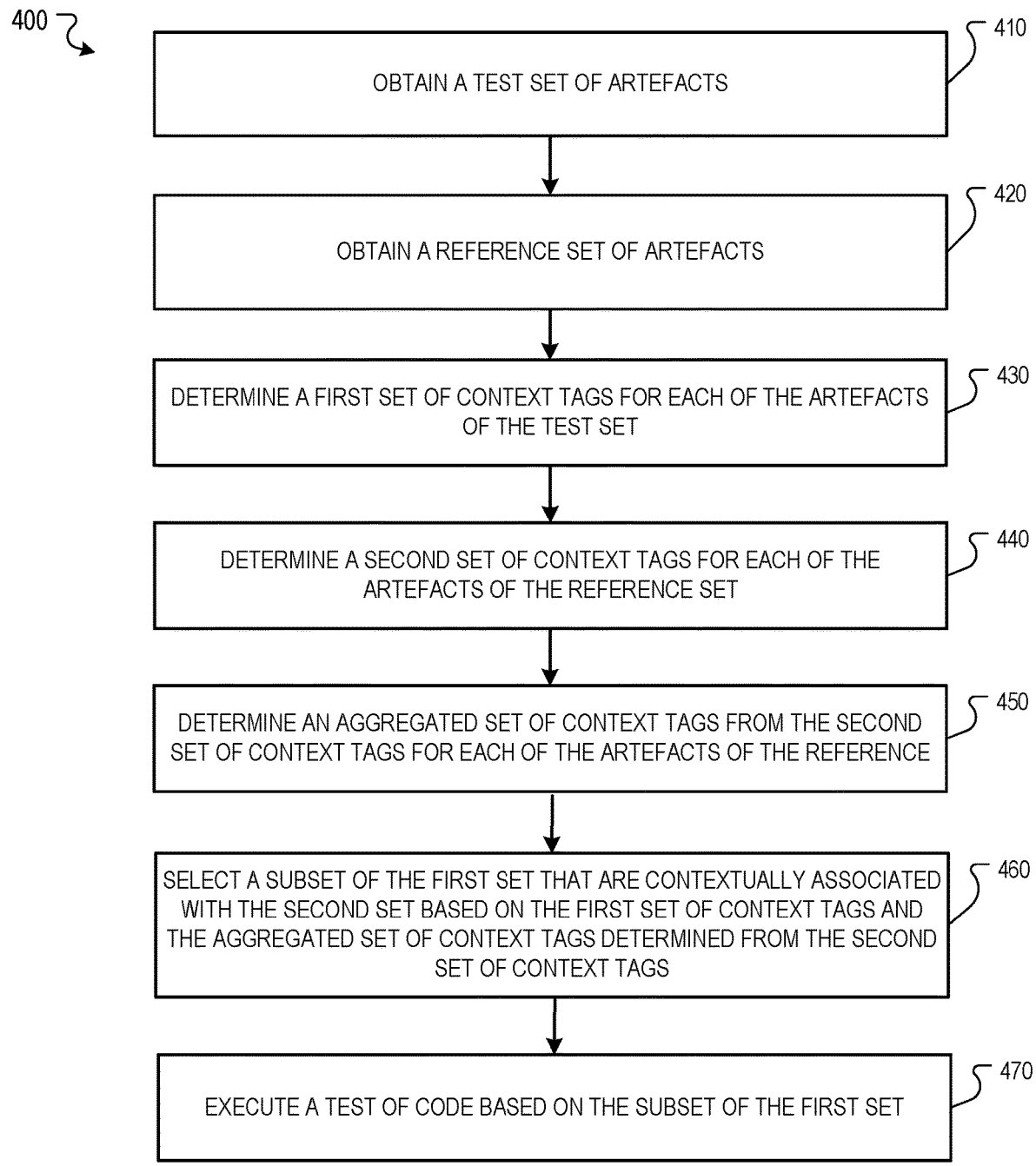
FIG. 4 illustrates a flowchart of an example process for test cycle optimization using contextual association mapping.

FIG. 4 illustrates a flowchart of an example process 400 for test cycle optimization using contextual association mapping. The process 400 may be performed using the system 100 described in FIG. 1 or another system. The process 400 includes obtaining a test set of artifacts (410). For example, the context tag extractor may receive S1. The process 400 includes obtaining a reference set of artifacts (420). For example, the context tag extractor may receive S2. The process 400 includes determining a first set of context tags for each of the artifacts of the test set (430). For example, the context tag extractor may extract tags from Si and output the tags. The process 400 includes determining a second set of context tags for each of the artifacts of the reference set (440). For example, the context tag extractor may extract tags from S2 and output the tags.

The process 400 includes determining an aggregated set of context tags from the second set of context tags for each of the artifacts of the reference set (450). For example, the context tag aggregator may receive the tags extracted from S2 and aggregate the tags. The process 400 includes selecting a subset of the first set that are contextually associated with the second set based on the first set of context tags and the aggregated set of context tags determined from the second set of context tags (460). For example, for each artifact in S1, the association comparator may compare the extracted tags for the artifact to the aggregated extracted tags to determine whether the artifact is contextually associated with S2 and, if determined to be contextually associated, select the artifact for inclusion in a subset of S1. The process includes executing a test of code based on the subset of the first set (470). For example, an automated testing engine may test the code using the subset of the first set.

Figure 5:
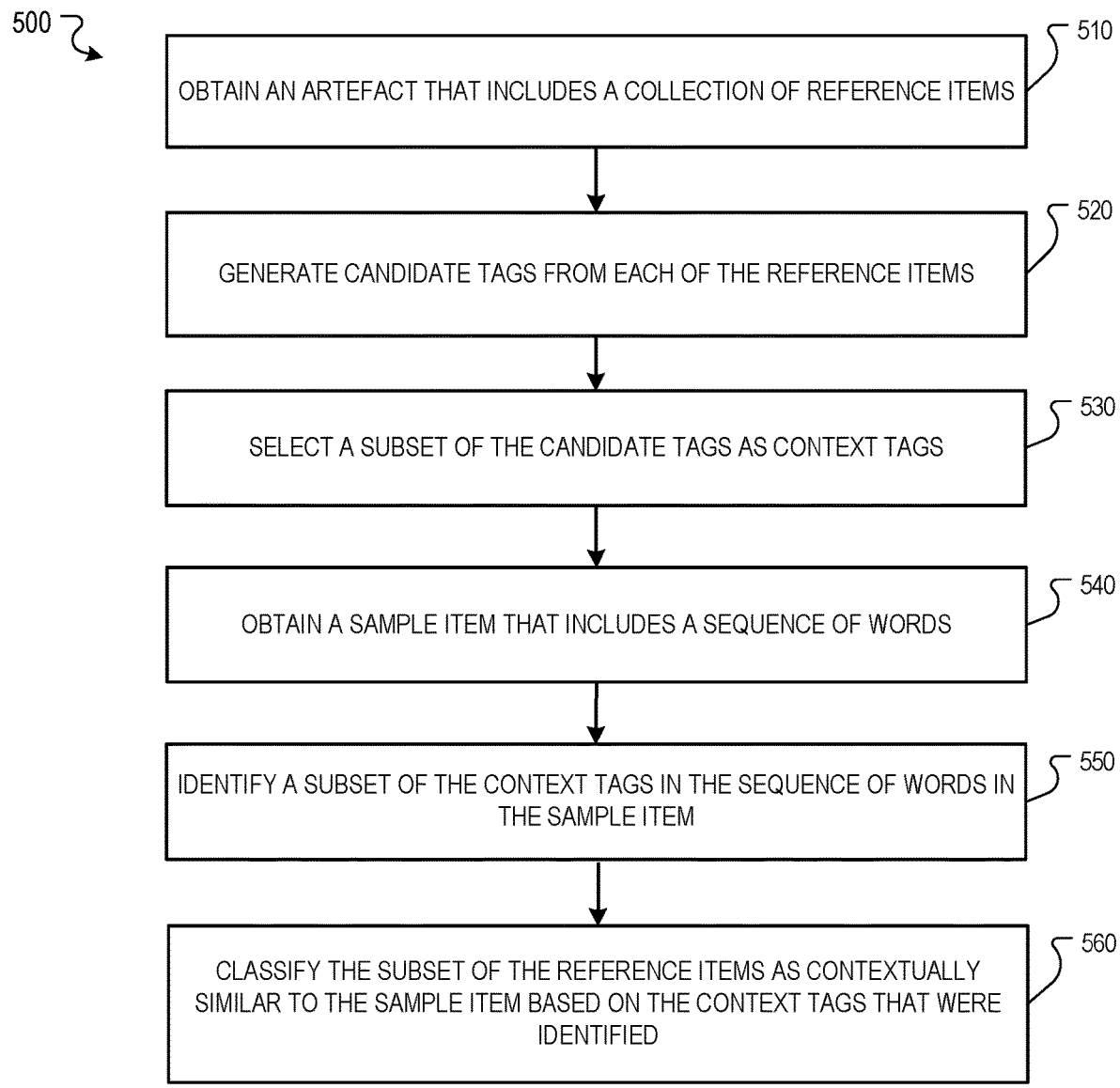
FIG. 5 illustrates a flowchart of another example process for test cycle optimization using contextual association mapping.

FIG. 5 illustrates a flowchart of an example process 500 for test cycle optimization using contextual association mapping. The process 500 may be performed using the system 100 described in FIG. 1 or another system. The process 500 includes obtaining an artifact that includes a collection of reference items (510). For example, the context tag extractor of FIG. 1 may receive an artifact in the form of a spreadsheet file, where the spreadsheet file includes a table with rows that each correspond to a different reference item.

In the example, one of the rows may be a reference item that is a test case that includes a sequence of words that form the text "Open Google Chrome and type 'www.PublicHeathMgmt.gov' in the URL field and press Enter. Once the web site opens, click on 'View General Information.' Now, click on Settings in the browser Menu and then click on 'Add Book Mark.' Close the Browser. Open a new Browser window, click on 'Book Marks' and click on the first Link. The www.PublicHealthMgmt.gov web site should open up."

The process 500 includes generating candidate tags from each of the reference items (520). For example, from the example text above, the context tag extractor of FIG. 1 may generate a first candidate tag of "open," a second candidate tag of "open google," a third candidate tag of "open google chrome," a fourth candidate tag of "google chrome," a fifth candidate tag of "google chrome and type," etc.

In some implementations, generating candidate tags from each of the reference items based on the sequences of words in the reference items includes generating the candidate tags from a particular reference item of the reference items based on different portions of the sequence of words in the reference item. For example, for a reference item of three words, the context tag extractor may generate a candidate tag for every possible combination of words in the sequence that they appear in the reference item, e.g., a first candidate tag that includes all three words, a second candidate tag that includes the first and second word, a third candidate tag that includes the second and third word, and three more candidate tags that correspond to one of the three words.

The process 500 includes selecting a subset of the candidate tags as context tags based on an amount (e.g., a frequency) that the candidate tags appear in the reference items (530). For example, the context tag extractor of FIG. 1 may select the candidate tags of "google chrome," "www.publichealthmgmt.gov," "press enter," "view general information," "settings," "browser menu," "add new book mark," and " book marks" for inclusion in the subset based on an amount of times that the candidate tags also appear in other items in the spreadsheet that includes the reference item.

In some implementations, selecting a subset of the candidate tags as context tags based on an amount that the candidate tags appear in the reference items includes determining, for each candidate tag, a number of reference items in which the candidate tag appears and determining, for each candidate tag, whether to select the candidate tag based on the number of reference items in which the candidate tag appears. In an example, the context tag extractor may determine that a first candidate tag appears in ten reference items out of one hundred reference items in a spreadsheet and, in response, select the first candidate tag. In another example, the context tag extractor may determine that a second candidate tag appears in one reference item out of one hundred reference items in a spreadsheet and, in response, not select the first candidate tag. In yet another example, the context tag extractor may determine that a third candidate tag appears in one hundred reference items out of one hundred reference items in a spreadsheet and, in response, not select the third candidate tag.

In some implementations, determining, for each candidate tag, whether to select the candidate tag based on the number of reference items in which the candidate tag appears includes determining that a proportion of the reference items that the candidate tag appears in satisfies a proportion criteria. For example, for each candidate tag, the context tag extractor may determine a percentage of the reference items in the spreadsheet that include the candidate, and select the candidate tag only if the percentage is between 1% and 25%, 2% and 20%, or some other criteria.

The process 500 includes obtaining a sample item that includes a sequence of words (540). For example, the context tag extractor of FIG. 1 may receive a defect item that includes a sequence of words of "while retrieving a URL www.PublicHealthMgmt.gov from Book marks in google chrome the web site works fine. However, the same URL does not work when retrieved from book marks in Opera."

The process 500 includes identifying a subset of the context tags in the sequence of words in the sample item (550). For example, the association comparator of FIG. 1 may identify that the context tags of "book marks" and "google chrome" also appear in the defect item.

In some implementations, identifying a subset of the context tags in the sequence of words in the sample item includes for each context tag, determining whether the sequence of words in the sample item include the context tag and in response to determining that the sequence of words in the sample item includes a particular context tag of the context tags, identifying the particular context tag. For example, the association comparator may search the sequence of words in the sample for the context tags of "google chrome," "www.publichealthmgmt.gov," "press enter," "view general information," "settings," "browser menu," "add new book mark," and " book marks" from the reference item, and also search for context tags that appear in other reference items.

In some implementations, identifying a subset of the context tags in the sequence of words in the sample item includes determining a domain of the sample item and selecting the context tags based on the domain of the sample item. For example, the association comparator may determine that the sample item belongs to the domain of healthcare and, in response, search in the sample item for only context tags that belong to the domain of healthcare. The context tags that belong to the domain of healthcare may have been selected by the context tag extractor based on artifacts that were indicated as belonging to the domain of healthcare. In another example, the association comparator may determine that the sample item belongs to the domain of banking and, in response, search in the sample item for only context tags that belong to the domain of banking.

The process 500 includes classifying a subset of the reference items as contextually similar to the sample item based the context tags that were identified (560). For example, in response to identifying that the context tags of "book marks" and "google chrome" also appear in the defect item, the association comparator of FIG. 1 may classify the reference item that includes the context tags as contextually similar to the sample item. In another example, in response to identifying that no context tags in a second reference item also appear in the sample item, the association comparator of FIG. 1 may classify the second reference item as not contextually similar to the sample item.

In some implementations, classifying a subset of the reference items as contextually similar to the sample item based the context tags that were identified includes determining that each of the reference items in the subset of reference items includes at least one of the context tags that were identified. For example, the association comparator may identify the reference items that include the identified context tags, classify those identified reference items as contextually similar to the sample item, and classify any other reference item as not contextually similar to the sample item.

In some implementations, the process 500 includes determining signatures for each of the context tags and determining attributes for each of the signatures, where classifying a subset of the reference items as contextually similar to the sample item based the context tags that were identified includes determining that the signatures for the context tags that were identified match signatures for the context tags in the reference items of the subset of the reference items.

For example, the context tag aggregator may display each candidate tag that was selected as a context tag to a human user to define a signature for the context tag. Signatures may refer to a category. For example, the context tags "google chrome," "opera," "firefox," and "browser" may all have a signature of browser, and the context tags "settings" and "book marks" may have the signature of settings," and the context tags "retrieve book mark," "update book mark," and "delete book mark," may all have the signature of actions."

When classifying the subset of reference items as contextually similar, the process 500 may initially attempt to find reference items with context tags that match the context tags in the sample item. However, in response to determining that no reference items have context tags that match the context tags in the sample item, the process 500 may then attempt to find reference items with context tags with signatures that match the signatures of context tags in the sample item.

In some implementations, the process 500 includes providing an indication of the reference items that were classified as contextually similar to the sample item. For example, the process 500 may list three, five, seven, or some other number of the reference items with the most number of matching context tags with the sample item in descending order of number of matches. Where there is a tie in a number of matching context tags, the process 500 may use the number of matching signatures as an additional factor. For example, in response to determining that a first reference item has four matching context tags and six matching signatures of context tags and a second reference has four matching context tags and five matching signatures of context tags, the system 100 may list the first reference item first followed by the second reference item.

Additional examples of the process 500 are described below in reference to the eight sample use cases described above of (i) how to identify duplicate test cases, (ii) how to prioritize and identify test cases based on production usage, (iii) how to prioritize and identify test cases based on production failure patterns, (iv) how to prioritize and identify test cases based on churn, (v) how to group test cases based on their contextual similarity and assign them to appropriate tester, (vi) how to identify duplicate defects, (vii) how to group defects based on contextual similarity and assign to appropriate developer, and (viii) how to identify defects that are contextually similar to the previously found defects. As previously mentioned, all of the use cases may be generalized as "given a set of input artifacts X, how do I identify a subset which are contextually associated with another set of reference artifacts Y."

For example, for the first use case of how to identify duplicate test cases, the process 500 may receive a sample item that is a test case for which a user would like to determine whether the test case is a duplicate. Accordingly, the process 500 may classify a subset of reference items as contextually similar to the test case and present the subset of the reference items to a human user to manually determine and indicate to a system whether the test case is truly a duplicate. Alternatively, once the process 500 classifies the subset of reference items as contextually similar to the test case, the test case may automatically be considered a duplicate and discarded without further input from a user after the classification.

For example, for the second use case of how to prioritize and identify test cases based on production failure patterns, the process 500 may receive a sample item that describes an execution pathway exercised by an actual user. Accordingly, the process 500 may classify a subset of reference items that are test cases as contextually similar to the sample item and then prioritize testing with those test cases as those test cases may reflect execution pathways that are more likely to be used by users.

For example, for the third use case of how to prioritize and identify test cases based on production failure patterns, the process 500 may receive a sample item that describes an execution pathway that resulted in a failure. Accordingly, the process 500 may classify a subset of reference items that are test cases as contextually similar to the sample item and then prioritize using those test cases as those test cases may be more likely to result in failure as they are more similar to an execution pathway that already resulted in failure.

For example, for the fourth use case of how to prioritize and identify test cases based on churn, the process 500 may receive a sample item that describes a feature or function that has undergone a change. Accordingly, the process 500 may classify a subset of reference items that are test cases as contextually similar to the sample item and then prioritize using the test cases as those may use the feature or function that was changed so may be more likely to fail.

For example, for the fifth use case of how to group test cases based on their contextual similarity and assign them to appropriate tester, the process 500 may identify a single test case in a list of test cases as a sample item, then classify a subset of reference items that are the remaining test cases in the list as contextually similar to the sample item, then group the single test case and test cases of the subset of reference items into a single group, and repeat for all remaining ungrouped test cases until all test cases are grouped. The different groups may then be assigned to testers.

For example, for the sixth use case of how to identify duplicate defects, the process 500 may receive a sample item that is a defect for which a user would like to determine whether the defect is a duplicate. Accordingly, the process 500 may classify a subset of reference items as contextually similar to the defect and present the subset of the reference items to a human user to manually determine and indicate to a system whether the defect is truly a duplicate.

For example, for the seventh use case of how to group defects based on contextual similarity and assign to appropriate developer, the process 500 may receive a sample item that describes a defect that was just reported. Accordingly, the process 500 may classify a subset of reference items as contextually similar to the defect, identify a developer who has been assigned to handle most of the reference items in the subset, and then assign the defect to that developer as that developer may be best skilled to resolve the defect.

For example, for the eighth use case of how to identify defects that are contextually similar to the previously found defects, the process 500 may receive a sample item that is a defect that was just reported. Accordingly, the process 500 may classify a prior defect as contextually similar to the defect and, in response, prioritize having the defect resolved as it may require deeper investigation as it was seemingly fixed earlier.

Figure 6:
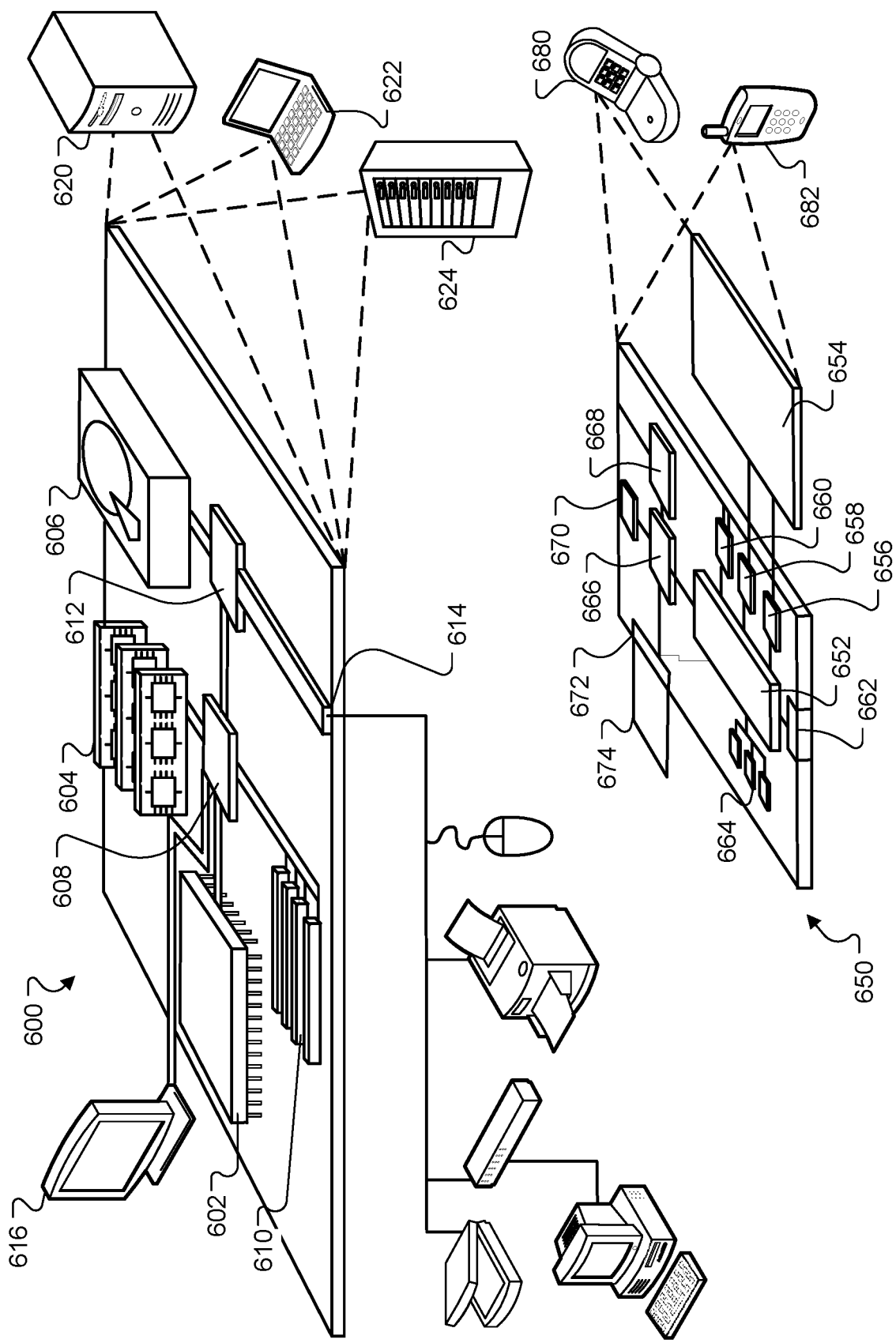
FIG. 6 illustrates an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various buses, and may be mounted on a common motherboard or in other manners as appropriate. The processor 602 can process instructions for execution within the computing device 600, including instructions stored in the memory 604 or on the storage device 606 to display graphical information for a graphical user interface (GUI) on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chip set of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652.

In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" and "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
    obtaining an artifact that includes a collection of reference test cases, where each reference test case includes a sequence of words;
    generating candidate tags from each of the reference test cases based on the sequences of words in the reference test cases;
    determining, for each of the candidate tags, a number of the reference test cases of the collection in which the candidate tag appears;
    determining, for each candidate tag, whether to select the candidate tag as a context tag used to classify the reference test cases based on the number of the reference test cases in which the candidate tag appears;
    obtaining a sample test case that includes a sequence of words;
    identifying a subset of the context tags in the sequence of words in the sample test case;
    classifying a subset of the reference test cases as contextually similar to the sample test case based the context tags that were identified; and
    executing another subset of the reference test cases instead of the subset of the reference test cases classified as contextually similar to the sample test case based the context tags that were identified.

2. The method of claim 1, wherein executing another subset of the reference test cases instead of the subset of the reference test cases classified as contextually similar to the sample test case based the context tags that were identified comprises:
    classifying the another subset of the reference test cases as not contextually similar to the sample test case based the context tags that were identified; and
    based on classifying the another subset of the reference test cases as not contextually similar to the sample test case, executing the another subset of the reference test case.

3. The method of claim 1, wherein executing another subset of the reference test cases instead of the subset of the reference test cases classified as contextually similar to the sample test case comprises:
    based on classifying the subset of the reference test cases as contextually similar to the sample test case, determining not to execute the subset of the reference test cases.

4. The method of claim 1, wherein determining, for each candidate tag, whether to select the candidate tag as a context tag used to classify the reference test cases based on the number of the reference test cases in which the candidate tag appears comprises:
    determining that a proportion of the reference test cases that the candidate tag appears in satisfies a proportion criteria.

5. The method of claim 1, wherein classifying a subset of the reference test cases as contextually similar to the sample test case based the context tags that were identified comprises:
    determining that each of the reference test cases in the subset of the reference test cases includes at least one of the context tags that were identified.

6. The method of claim 1, wherein generating candidate tags from each of the reference test cases based on the sequences of words in the reference test cases comprises:
    generating the candidate tags from a particular reference test case of the reference test cases based on different portions of the sequence of words in the reference test case.

7. The method of claim 1, wherein identifying a subset of the context tags in the sequence of words in the sample test case comprises:
    for each context tag, determining whether the sequence of words in the sample test case includes the context tag; and
    in response to determining that the sequence of words in the sample test case includes a particular context tag of the context tags, identifying the particular context tag.

8. The method of claim 1, wherein identifying a subset of the context tags in the sequence of words in the sample test case comprises:
    determining a domain of the sample test case; and
    selecting the context tags based on the domain of the sample test case.

9. The method of claim 1, comprising:
    determining signatures for each of the context tags; and
    determining attributes for each of the signatures,
    wherein classifying a subset of the reference test cases as contextually similar to the sample test case based the context tags that were identified comprises:
        determining that the signatures for the context tags that were identified match signatures for the context tags in the reference test case of the subset of the reference test case.

10. A system comprising:
    one or more computers and one or more storage devices storing instructions that are operable, when executed by the one or more computers, to cause the one or more computers to perform operations comprising:
        obtaining an artifact that includes a collection of reference test cases, where each reference test case includes a sequence of words;

generating candidate tags from each of the reference test cases based on the sequences of words in the reference test cases;

determining, for each of the candidate tags, a number of the reference test cases of the collection in which the candidate tag appears;

determining, for each candidate tag, whether to select the candidate tag as a context tag used to classify the reference test cases based on the number of the reference test cases in which the candidate tag appears;

obtaining a sample test case that includes a sequence of words;

identifying a subset of the context tags in the sequence of words in the sample test case;

classifying a subset of the reference test cases as contextually similar to the sample test case based the context tags that were identified; and executing another subset of the reference test cases instead of the subset of the reference test cases classified as contextually similar to the sample test case based the context tags that were identified.

11. The system of claim 10, wherein executing another subset of the reference test cases instead of the subset of the reference test cases classified as contextually similar to the sample test case based the context tags that were identified comprises:

classifying the another subset of the reference test cases as not contextually similar to the sample test case based the context tags that were identified; and based on classifying the another subset of the reference test cases as not contextually similar to the sample test case, executing the another subset of the reference test case.

12. The system of claim 10, wherein executing another subset of the reference test cases instead of the subset of the reference test cases classified as contextually similar to the sample test case comprises:

based on classifying the subset of the reference test cases as contextually similar to the sample test case, determining not to execute the subset of the reference test cases.

13. The system of claim 10, wherein determining, for each candidate tag, whether to select the candidate tag as a context tag used to classify the reference test cases based on the number of the reference test cases in which the candidate tag appears comprises:

determining that a proportion of the reference test cases that the candidate tag appears in satisfies a proportion criteria.

14. The system of claim 10, wherein classifying a subset of the reference test cases as contextually similar to the sample test case based the context tags that were identified comprises:

determining that each of the reference test cases in the subset of the reference test cases includes at least one of the context tags that were identified.

15. The system of claim 10, wherein generating candidate tags from each of the reference test cases based on the sequences of words in the reference test cases comprises:

generating the candidate tags from a particular reference test case of the reference test cases based on different portions of the sequence of words in the reference test case.

16. The system of claim 10, wherein identifying a subset of the context tags in the sequence of words in the sample test case comprises:

for each context tag, determining whether the sequence of words in the sample test case includes the context tag; and in response to determining that the sequence of words in the sample test case includes a particular context tag of the context tags, identifying the particular context tag.

17. The system of claim 10, wherein identifying a subset of the context tags in the sequence of words in the sample test case comprises:

determining a domain of the sample test case; and selecting the context tags based on the domain of the sample test case.

18. The system of claim 10, the operations comprising:

determining signatures for each of the context tags; and determining attributes for each of the signatures, wherein classifying a subset of the reference test cases as contextually similar to the sample test case based the context tags that were identified comprises:

determining that the signatures for the context tags that were identified match signatures for the context tags in the reference test case of the subset of the reference test case.

19. A non-transitory computer-readable medium storing software comprising instructions executable by one or more computers which, upon such execution, cause the one or more computers to perform operations comprising:

obtaining an artifact that includes a collection of reference test cases, where each reference test case includes a sequence of words;

generating candidate tags from each of the reference test cases based on the sequences of words in the reference test cases;

determining, for each of the candidate tags, a number of the reference test cases of the collection in which the candidate tag appears;

determining, for each candidate tag, whether to select the candidate tag as a context tag used to classify the reference test cases based on the number of the reference test cases in which the candidate tag appears;

obtaining a sample test case that includes a sequence of words;

identifying a subset of the context tags in the sequence of words in the sample test case;

classifying a subset of the reference test cases as contextually similar to the sample test case based the context tags that were identified; and executing another subset of the reference test cases instead of the subset of the reference test cases classified as contextually similar to the sample test case based the context tags that were identified.

20. The medium of claim 19, wherein executing another subset of the reference test cases instead of the subset of the reference test cases classified as contextually similar to the sample test case based the context tags that were identified comprises:

classifying the another subset of the reference test cases as not contextually similar to the sample test case based the context tags that were identified; and based on classifying the another subset of the reference test cases as not contextually similar to the sample test case, executing the another subset of the reference test case.

* * * * *